United States Patent [19]

Lambert et al.

[11] Patent Number: 5,786,600
[45] Date of Patent: Jul. 28, 1998

[54] (BARIUM HAFNATE:TI, CE, PB) PHOSPHORS PHOSPHOR SCREENS AND PHOSPHOR PREPARATION METHODS

[75] Inventors: Patrick Maddock Lambert, Rochester; Gregory S. Jarrold, Henrietta; Philip Steven Bryan, Webster, all of N.Y.

[73] Assignee: Eastman Kodak Company, Rochester, N.Y.

[21] Appl. No.: 574,481

[22] Filed: Dec. 19, 1995

[51] Int. Cl.$^6$ .................................................. C09K 11/67
[52] U.S. Cl. .............................. 250/484.4; 252/301.4 F
[58] Field of Search ....................... 250/483.1, 484.4; 252/301.4 F

[56] References Cited

U.S. PATENT DOCUMENTS

| | | |
|---|---|---|
| 2,542,336 | 2/1951 | Kröger et al. . |
| 4,994,205 | 2/1991 | Bryan et al. ............... 252/301.4 F |
| 5,095,218 | 3/1992 | Bryan et al. ............... 252/301.4 F |
| 5,112,700 | 5/1992 | Lambert et al. ............... 428/690 |
| 5,124,072 | 6/1992 | Dole et al. ............... 252/301.4 F |

OTHER PUBLICATIONS

Some Aspects of the Luminescence of solids, F. A. Kroger, Elsevier, Amsterdam (1948), p. 161.
A New Family of Self–activated Phosphors, D. E. Harrison et al., J. Electrochem. Soc. vol. 110 (1), 1963 pp. 23–28.
Fluorescence of $Eu^{2+}$–Activated Silicates, G. Blasse, et al., Philips Res. Repts., vol. 23, 1968 pp. 189–200.
Energy Transfer in Oxidic Phosphors, G. Blasse, Philips Res. Repts., vol. 24, 1969 pp. 131–144.
Investigations on the Luminescence of Titanium–Activated Stannates and Zirconates, A.J.H. Macke, J. Solid State Chem., vol. 18, 1976 pp. 337–346.
On the Luminescence of Hafnium Compounds, W. J. Schipper, et al., Mat. Res. Bull., vol. 29, 1994 pp. 23–30.
Proprietes de Luminescence des zirconates alcalinoterreux purs ou actives par l'ion $Pb^{2+}$, J. Chanewayne et al., C. R. Acad. Sc. Paris, vol. 271, 1970 p. 486.
Influence of Crystal Structure on the Luminescence of Ions with $s^2$ Configuration, G. Blasse, et al., J. Solid State Chem., vol. 20, 1977 pp. 63–65.

*Primary Examiner*—David P. Porta
*Assistant Examiner*—Richard Hanig
*Attorney, Agent, or Firm*—Carl O. Thomas

[57] ABSTRACT

(Barium hafnate:Ti,Ce,Pb) phosphors, phosphor screens and phosphor preparation method. The phosphor screen includes a support and a luminescent portion. The phosphor includes oxygen and a combination of species characterized by the relationship:

$$(Ba_{1-d}M_d)(Hf_{1-z-e}Zr_zMg_e):yCe,y'Ti,y''Pb$$

where M is selected from the group consisting of Ca, and Sr, and combinations thereof; d is from 0 to 0.05; z is from 0 to 0.25; e is from 0 to 0.15; y is from 0 to 0.025; y' is from 0 to 0.05; y" is from 0 to 0.01; and y+y'+y" is from $1\times10^{-6}$ to 0.05. The phosphor is x-ray luminescent at a temperature of 300° K.

27 Claims, 1 Drawing Sheet

(BARIUM HAFNATE:TI, CE, PB) PHOSPHORS PHOSPHOR SCREENS AND PHOSPHOR PREPARATION METHODS

Cross-Reference to Related Application

This application is related to a U.S. Ser. No. 08/574,507 "(BARIUM HAFNATE:Cu,Eu,Dy,Sm,Ho,Er,Tm) PHOSPHORS AND PHOSPHOR SCREENS", filed concurrently herewith, by Patrick M. Lambert, Gregory S. Jarrold, and David P. Trauernicht; which is hereby incorporated herein by reference.

FIELD OF THE INVENTION

The invention relates to phosphors and phosphor screens and more particularly relates to improved activated barium hafnate phosphors and screens including those phosphors.

Background of the Invention

Phosphors have long been used in a variety of articles that can be referred to as "phosphor screens" or "phosphor-based radiation converters", articles that include a support and a phosphor-containing luminescent portion, and function to screen or capture X-rays and other high energy radiation for emission at a longer wavelength, either immediately or on a delayed basis following secondary stimulation. Information represented by the modulation of the captured radiation is reproduced in the emitted longer wavelength radiation. (As a matter of convenience, these articles are referred to generically herein as "phosphor screens" or "screens". Specific types of phosphor screens are further identified herein by commonly used designations, for example, "intensifying screens", "storage screens", "scintillators".)

Many types of phosphor screen are used to detect imagewise X-radiation absorption by a target interposed between the phosphor screen and an X-ray source. A widely used variety of phosphor screen is a radiographic phosphor panel or screen. These articles are rigid or flexible sheet or plates having a thin luminescent layer that contains a radiographic phosphor. Flexible radiographic phosphor screens are generally exposed while flat, but can be utilized while bent into a cylinder or more complex shape, particularly for industrial applications. Like many other crystalline materials, radiographic phosphors have a crystal matrix which allows for the replacement of some atoms by other similar atoms, but does not readily accept other atoms or moieties. Radiographic phosphor screens can be classified, based upon their phosphors, as prompt emission screens and image storage screens.

Intensifying screens are the most common prompt emission screens. Intensifying screens are used to generate visible light upon exposure of the intensifying screen to X-radiation. A sheet of photographic film is positioned to intercept the visible light generated and commonly is pressed against the intensifying screen within a light-tight cassette. Other prompt emission screens operate similarly, but in place of the photographic film have some other means for visualizing the X-radiation.

In intensifying screen/film technology, there is a need for efficient phosphors that absorb X-radiation and emit longer wavelength light in spectral regions matching native silver halide sensitivity. A developable latent image is formed in a silver halide emulsion layer of a radiographic element when it is imagewise exposed to radiation. Silver halide emulsions, however, more efficiently absorb and, consequently, are more responsive to longer wavelength electromagnetic radiation than to X-radiation. Silver halides possesses native sensitivity to both the near ultraviolet and blue regions of the spectrum. Consequently, it is accepted practice to employ intensifying screens in combination with silver halide emulsion layers. An intensifying screen contains on a support a fluorescent layer that absorbs the X-radiation more efficiently than the silver halide and emits to the adjacent silver halide emulsion layer longer wavelength electromagnetic radiation in an image wise pattern corresponding to that of the X-radiation received. While the phosphor layer and the emulsion layer can be integrated into one element, in most instances the adjacent silver halide layer is coated on a separate support to form a separate radiographic element. In this way, the intensifying screen, which is not permanently altered to any significant degree by exposure, can be reused. The most common arrangement for X-radiation exposure is to employ a dual coated radiographic element (an element with silver halide emulsion layers on opposite sides of a support); each emulsion layer being mounted adjacent a separate intensifying screen.

The useful native sensitivity (i.e., maximum absorption capability) of silver halide emulsions lies in the near ultraviolet (300–400 nm) and blue (400–500 nm) portions of the spectrum. The native sensitivity of silver chloride is negligible beyond 450 nm, with the sensitivity dropping approximately 2 orders of magnitude between 380 and 420 nm. The native sensitivity of silver bromide is negligible beyond 500 nm, with sensitivity dropping approximately 2 orders of magnitude between 450 and 490 nm. The native sensitivity of silver bromoiodide (3 mole % iodide) is negligible beyond 550 nm, with sensitivity dropping approximately 2 orders of magnitude between 470 and 530 nm. Thus, not only do silver halides fail to absorb efficiently in the green portion of the spectrum, the absorption of silver halides in the longer wavelength regions of the blue spectrum is relatively limited.

Green-emitting intensifying screens have found wide application with silver halide emulsions, however, this requires the sensitization of the silver halide by adsorbed spectral sensitizing dyes. The disadvantages of such a systems include added expense, since the dyes are complex organic compounds which, on a weight basis, are more expensive than silver, and are not recoverable for reuse. Also, emulsion addenda that adsorb to silver halide grain surfaces, such as antifoggants and stabilizers, can displace the dyes, leading to reduced spectral sensitivity.

High density X-ray phosphors are also particularly desired in screen/film systems to deliver improved image quality. The X-ray absorbing properties of these phosphors allow the construction of thinner screens, which, because of the shorter total path length to the adjacent silver halide emulsion layer(s), yield less blurring or spreading of the X-ray image. For a given phosphor particle size, an increase in image sharpness is apparent. Alternatively, the thickness of the phosphor layer can remain unchanged and the quantum noise of the system improved by increased X-ray absorption.

Storage screens have storage phosphors, that have the capability of storing latent X-ray images for later release, apparently by locally trapping electron-hole pairs created by incident X-rays. Storage phosphors are distinguishable from the phosphors used in X-ray intensifying or conversion screens. In the latter, a latent image is not stored and X-radiation causes the immediate release of visible light from irradiated phosphor crystals.

Radiation image storage screens are used in computed radiography. The screen is first exposed to X-radiation to create a latent image. The screen is then stimulated with longer wavelength radiation, resulting in the emission of radiation at a third wavelength. Typically a laser having a red or infrared beam is scanned over the screen, resulting in the emission of green or blue radiation. The emitted light is collected and the resulting signal is processed electronically to produce a final image.

X-ray storage phosphors and image storage screens are characterized by a number of properties including sensitivity, efficiency, linearity, resolution, noise, dark decay (the ability of the phosphor or screen to retain the image over time), and emission lifetime. It is generally desired that the sensitivity of the photostimulated luminescence of the screen or screen be made as high as possible to decrease the exposure dose for the patient while maintaining high image quality.

In storage phosphor screens, the use of a high density X-ray phosphor allows the use of a thinner screen in a manner similar to that described above for screen-film systems. A thinner phosphor/binder layer can be utilized to get the same X-ray absorption as for a thicker layer containing a phosphor of lower density. The thinner screen yields lower scatter of the stimulating and emitted light and improved resolution.

Storage phosphors are also used in other types of phosphor screen: high Z dosimeters and optical storage elements. These uses require the material characteristics of high energy storage and excellent signal stability.

In high Z dosimeters, stored energy from irradiation is thermally accessed, i.e., the exposed phosphor powder or crystal is subjected to a heat cycle which yields a luminescence glow curve at a given temperature porportional to the absorbed irradiation. Sensitivity, availability and stability of low-lying traps, and chemical stabilty are important critieria in the application. A specific application of a high Z dosimeter is in combination with low and moderate Z materials as the detection element in a X-ray spectrometer. The distribution of energies is discerned by the differential absorption of the X-rays in the different Z dosimeters.

In the application of storage phosphors as optical storage materials, stored energy is sensed via optical stimulation. Information is written to a crystalline plate of storage phosphor by a blue or UV laser. The memory is interrogated by stimulating light. In theory, very high density storage is possible, as a focussed laser beam can used in combination with gray scale recording. The memory can be periodically refreshed depending on the application and the characteristics of the material. Important requirements in this technology include efficient UV or blue lasers, high energy storage and linearity, excellent signal retention, and storage materials in the form of single crystal or oriented multiple crystals.

Scintillators utilize prompt emitting phosphor crystals of large or relatively large size. These phosphor screens can be flat or can have complex shapes, and sometimes utilize only a single very large crystal. Scintillators are used in high energy physics and medical applications. The material demands usually include the following:

1) High luminescence response to incident radiation or particles. Only in the case of the electromagnetic calorimeters used for high-energy physics experimentation is this requirement relaxed. The emission wavelength should be matched to the detector response (photomultipliers, proportional counters, Si photodiodes). For example, high energy physics calorimeters require only that lamda$_{em}$>300 nm, while integrating techniques such as CT require lamda$_{em}$>450 nm.

2) Very rapid relaxation times. For example, in high energy calorimeters, decay times of less then 20 ns are required, while in positron emission tomography (PET) relaxation times must be <1 ns. Other applications, such as computed tomography (CT) and gamma-ray cameras have less stringent decay time requirements (up to 100's of microseconds).

3) High radiation stopping power for size minimization.

Materials with low-stopping power are needed as large pieces, in some cases single crystals up to 25 cm in length are required.

4) High transmittance. Crystals of excellent optical clarity are generally needed so that the majority of the emitted light can be conveniently collected at an edge or face of the element.

5) Low afterglow. This is particularly important in CT systems.

6) Good radiation hardness.

The scintillators are usually coupled to light detectors such as photomultipliers or silicon photodiodes. For example, in computed tomography, a rotating, fan-shaped X-ray beam transects the patient, and then interacts with the scintillator element, which, in turn, is coupled to a Si photodiode with a maximum response in the 500–1000 nm range. The emitted light is then proportional to the incident X-ray. The scintillator elements can be fashioned as single crystals, or as sintered polycrystalline pieces of high optical clarity.

*Some Aspects of the Luminescence of Solids*, F. A. Kroger, Elsevier, Amsterdam (1948) p. 161, teaches that a $BaZrO_3$ host showed no luminescence at room temperature or $-180°$ C. "A New Family of Self-activated Phosphors", D. E. Harrison, et al., *J. Electrochem. Soc.*, Vol. 110 (1), (1963) pp. 23–28 describes $BaZrO_3$ (and another material) as "non luminescent compounds".

"Fluorescence of $Eu^{2+}$-Activated Silicates", G. Blasse, et al., *Philips Res. Repts.*, Vol. 23, (1968) pp. 189–200 teaches that $BaZrO_3:Eu^{2+}$ exhibits a broad green prompt luminescence (centered at approximately 495 nm) and that this is an example of an emission with $Eu^{2+}$ in a cubic site. "Energy Transfer in Oxidic Phosphors", G. Blasse, *Philips Res. Repts.*, Vol. 24, (1969) pp. 131–144 teaches as to $BaZrO_3:Eu^{2+}$ that: "As the luminescence of $BaZrO_3:Eu^{2+}$ is very weak, neither the value of $x_c$ nor of $t_r$ has been determined." "On the Luminescence of Hafnium Compounds", W. J. Schipper, et al., *Mat. Res. Bull.*, Vol. 29, (1994) pp. 23–30 discloses that the "efficient" green luminescence reported for a $BaZrO_3:Eu^{2+}$ could not be reproduced.

*Some Aspects of the Luminescence of Solids*, F. A. Kroger, Elsevier, Amsterdam (1948) p. 161, teaches that $BaZrO_3$ activated with 1 mole percent titanium showed deep blue luminescence at $-180°$ C., but no emission at room temperature. U.S. Pat. No. 2,542,336 to Kroger et al., teaches phosphors containing titanium as an activator and having a matrix composed of one or more of the oxides of zirconium, hafnium, thorium, germanium and tin and optionally including either acid oxides or basic oxides or both. Disclosed basic oxides are the oxides of sodium, potassium, rubidium, cesium, lithium, barium, calcium, strontium, magnesium, beryllium, and zinc. Disclosed acid oxides are $SO_3$, $B_2O_3$, $P_2O_5$ and $SiO_2$. Titanium-activated zirconium oxide, magnesium stannate, calcium zirconate and zirconium phosphate are each specifically disclosed. "Investigations on the Luminescence of Titanium-activated Stannates and Zirconates", A. J. H. Macke, *J. Solid State Chem.*, Vol. 18, (1976) pp. 337–346 discloses a study of the luminescence of $BaZr_{0.99}Ti_{0.01}O_3$. A broad emission centered at 2.87 eV (432 nm) was observed, but only at or below liquid nitrogen temperature. "On the Luminescence of Hafnium Compounds", W. J. Schipper, et al., *Mat. Res. Bull.*, Vol. 29, (1994) pp. 23–30 teaches that a violet-blue emission was observed (at 410 nm) at 4.2° K. for $BaHfO_3$:Ti. The emission was not observed at temperatures above about 250° K. The article also states: "$HfO_2$ and $BaHfO_3$ do not luminesce ... Upon doping with Ti, emission in the blue spectral region appears, except for $HfP_2O_7$:Ti. The titanate luminescence is largely quenched at room temperature, limiting the use of these materials as X-ray or X-ray storage materials."

"Propriétés de luminescence des zirconates alcalinoterreux purs ou activés par l'ion $Pb^{2+}$", J. Chaneway, et al., *C. R. Acad. Sc. Paris*, Vol. 271, (1970) p. 486 discloses a study of zirconates of the type $MZrO_3$ with and without $Pb^{2+}$ at 77° K. The $BaZrO_3$ host showed a broad emission at 424 nm at this temperature and $Pb^{2+}$ activated host material showed a very broad emission at approximately 580 nm. $CaZrO_3$:$Pb^{2+}$ was cited as the most intense of the lead-activated compounds, with a severe intensity decrease observed at room temperature. "Influence of Crystal Structure on the Luminescence of Ions with $s^2$ Configuration", G. Blasse, et al., *J. Solid State Chem.*, Vol. 20, (1977) pp. 63–65 discloses that $BaZrO_3$:$Pb^{2+}$ exhibited a green luminescence (centered at 495 nm) at 77° K. The luminescence was quenched at 260° K.

U.S. Pat. No. 4,994,205 to Bryan, et al. teaches the phosphor $HfO_2$:Ti and an intensifying screen for producing a latent image in a silver halide radiographic element when imagewise exposed to X-radiation. The screen contains a phosphor having a hafnia host containing zirconia in concentrations higher than those found in optical grade hafnia. The phosphor can include as an activator one or a combination of titanium, rare earth, and alkali metal ions. Phosphor preparation processes are also described.

U.S. Pat. No. 5,112,700 to Lambert, et al. teaches the phosphor $HfGeO_4$:Ti. The titanium activated Hf—Zr germanate phosphor disclosed emits electromagnetic radiation principally in the spectral region to which silver halide exhibits native sensitivity. To maximize the intensity of emission the ratio of host metals satisfies the relationship:

$$D_{1-x}Ge_{1-x}$$

where D is the combined sum of zirconium and hafnium and x is 0.25 to –0.70. An X-ray intensifying screen is disclosed containing the phosphor composition.

There is thus a continuing need for improved phosphors, preparation methods, and phosphor screens; in which high density phosphors can exhibit prompt emissions or photostimulated emissions of secondary radiation in useful wavelength ranges and with good speed.

SUMMARY OF THE INVENTION

The invention is defined by the claims. The invention, in its broader aspects, provides (barium hafnate:Ti,Ce,Pb) phosphors, phosphor screens and a phosphor preparation method. The phosphor screen includes a support and a luminescent portion. The phosphor includes oxygen and a combination of species characterized by the relationship:

$$(Ba_{1-d}M_d)(Hf_{1-z-e}Zr_zMg_e):yCe,y'Ti,y''Pb$$

where M is selected from the group consisting of Ca, and Sr, and combinations thereof; d is from 0 to 0.05; z is from 0 to 0.25; e is from 0 to 0.15; y is from 0 to 0.025; y' is from 0 to 0.05; y" is from 0 to 0.01; and y+y'+y" is from $1\times10^{-6}$ to 0.05. The phosphor is x-ray luminescent at a temperature of 300° K.

It is an advantageous effect of at least some of the embodiments of the invention that improved phosphors, and phosphor preparation methods, and phosphor screens are provided in which the phosphors can exhibit prompt emissions or photostimulated emissions of secondary radiation in useful wavelength ranges and with good speed.

BRIEF DESCRIPTION OF THE FIGURES

The above-mentioned and other features and objects of this invention and the manner of attaining them will become more apparent and the invention itself will be better understood by reference to the following description of embodiments of the invention taken in conjunction with the accompanying figures wherein.

DESCRIPTION OF THE PREFERRED EMBODIMENTS

The phosphor screen of the invention is an article of manufacture that includes a support and a phosphor-containing luminescent portion. The phosphor screen is generally described herein as if the phosphor screen were in the shape of a horizontally disposed flat plate. It is to be understood, however, that the phosphor screen is not limited to any particular shape and that directional terms refer only to relative positions, not an absolution orientation relative to the environment. For example, in different embodiments, the phosphor screen has the form of a rigid planar panel, or a flexible sheet able to assume a variety of shapes, or a rigid cylindrical tube, or a complex three dimensional shape. Similarly, in different embodiments, the luminescent portion has small or large crystals or even a single crystal; held in place by a layer of binder, or adhered in place, or held in place mechanically by fasteners or the like.

The phosphor of the invention is a crystalline material. The structure of crystalline materials on a "molecular level" can be catagorized in a number of ways. Crystal structures can be categorized, in some cases, by analogy to various minerals. Oxides which crystallize in the undistorted, simple perovskite structure are usually represented by the formula $ABO_3$. The A atom is in the center of a cube and B atoms at each corner. Crystal structures can also be categorized by use of: (1) crystal system, (2) lattice type, and (3) point and space symmetry. The crystal system of a material is the basic geometry of the "unit cell": the smallest repeating unit which has the same symmetry as larger portions of the material. Crystalline materials are assigned to seven crystal systems: cubic, hexagonal, tetragonal, orthorhombic, monoclinic, trigonal, and triclinic; each of which is distinguished by the length and spatial relationships of the cell axes.

Bravais lattice types elaborate on the unit cell descriptions of crystal systems. Lattice types looks to the same array of lattice points as the crystal system, but also looks to positions in the center of the unit cell (body-centered), on the faces (face-centered), and at the vertices (primitive). As in crystal systems, the lattice points and other positions used in classification are geometric positions that may or may not coincide with the positions of atoms in the unit cell. There are 14 Bravais lattice types. Crystal system and Bravais lattice types can be used in combination to describe crystalline materials, with the exception that some combinations of crystal system and Bravais lattice type are redundant or geometrically incompatible.

Point and space symmetry refers to the use of symmetry elements to define a material. Symmetry elements are operations such as reflections and rotations that transform a structure to an orientation that is indecipherable from the original orientation. The combination of Bravais lattice type with point and space symmetry results in what is referred to as the "space group". There are 230 space groups which represent the combination of the 14 Bravais lattice types with the three dimensional symmetry elements. The structure of a crystal can be thought of as a draping of the ions or atoms of the compound within the geometry and symmetry indicated by the space group designation. The locations of the atoms or ions are given as fractional atomic coordinates within the unit cell parameters. The space group Pm3m has the following fractional atomic coordinates:

| A atom  | = 0, 0, 0       |
|---------|-----------------|
| B atom  | = 0.5, 0.5, 0.5 |
| Oxygens | = 0.5, 0.5, 0   |
|         | = 0.5, 0, 0.5   |
|         | = 0, 0.5, 0.5   |

The categorization of a particular crystalline material into a particular crystal system and space group is limited by the resolution of the diffractometer or camera used. Such materials are sometimes described in more exact terms as having a distortion from or substantial resemblance to the geometric model of a particular crystal system and space group. On the other hand, the phosphor of the invention can be referred to simply as having a cubic perovskite structure and Pm3m space group, since within the resolution limits of high resolution X-ray powder diffraction using $Cu_{\alpha 1}$ irradiation, the phosphor of the invention does not depart from the geometric model. (The high resolution X-ray powder diffraction technique utilized was Gunier-DeWolfe utilizing standard irradiation inclusive of $Cu_{\alpha 1}$ (wavelength=1.54051 Å).) Minute variances from the atomic positions indicated by cubic perovskite structure and Pm3m space group, could exist; but such differences are too small to be expressed as additional or split lines in the high resolution X-ray powder diffraction pattern. It is expected that other embodiments of the phosphor of the invention will also have this same cubic Perovskite structure and Pm3m space group, within the same resolution limits; however, even if such embodiments showed a deformation, those phosphors would still be classified as having a substantially cubic Perovskite structure and Pm3m space group.

The phosphor of the invention includes oxygen and a combination of species characterized by the relationship:

(formula I)

The same designations appearing elsewhere herein have the same meanings unless specifically stated to the contrary. Grouped species, for example the species defined by M, are to be understood as inclusive of combinations of species in that group. M is thus Ca or Sr or a combination of the two. Ca and Sr act much like "contaminants" in the phosphor of the invention, that is, Ca and Sr do not appear to provide an advantage when present; but, in relatively low concentrations, do not reduce the magnitude of luminescence. The concentration or mole fraction of M, the value of d, is from 0 to 0.05. Preferred ranges for Ca and Sr vary depending upon activator and whether the phosphor is intended as a prompt emission or storage phosphor. This is discussed below in greater detail.

Limits on mole fractions expressed herein for the various atoms of the phosphor, do not represent useful ranges for the preparation of crystalline materials, nor even useful ranges for the preparation of materials which are capable of exhibiting prompt or photostimulated luminescence under laboratory conditions. The limits expressed herein instead represent ranges for the preparation of phosphors that exhibit sufficient prompt or photostimulated luminescence or both, to be useful in practical phosphor screens, such as intensifying screens, storage phosphor screens, and scintillators. Many materials exhibit luminescence that is measurable, but is at to low a level for use in practical articles or is present only at very low temperatures.

Formula I can be rewritten substituting in Ca and Sr:

(formula II)

In formulas I and II, the mole fractions of Ca and Sr are subtracted from the mole fraction of Ba. On the other hand, the mole fraction of the other alkaline earth metal in the formulas, Mg, is subtracted from the mole fraction of hafnium. This is believed to be an accurate representation of the phosphor. It has been determined with reasonable certainty that calcium and strontium substitute into the crystal lattice at barium sites, whereas magnesium substitutes at hafnium sites. This effect is believed to be predominantly a question of the size of the Mg ion. (Hafnium sites are also shared by zirconium. Hf and Zr are very similar in size and it is well known that Zr substitutes into Hf lattice sites in many materials.) Thus, for example, in what is considered the unlikely event that the above explanation is incorrect and Mg substitutes into the Ba site rather than the Hf—Zr site; the above formulas although cumbersome are still valid, and the scope of the claims is unchanged.

The value of e, the mole fraction of Mg, is from 0 to 0.15. The value of z, the mole fraction of Zr, is from 0 to 0.25. It is preferred, from the viewpoint of economical starting materials, to have z in the range of from $1 \times 10^{-5}$ to 0.15.

It is currently preferred that the phosphor of the invention be prepared from precursors fired in the presence of a particular flux or addendum. The flux has precursors containing the alkali metal Li or K or a mixture of Li and K or a precursor containing germanium or precursors for both the alkali metal or metals and germanium. The flux reduces the temperature at which precursor materials must be fired to prepare the phosphor of the invention by as much as 100° C. This is an important practical advantage.

The phosphor produced using such flux retains a portion of the alkali metal or metals and/or germanium from the flux. It is hypothesized that the alkali metal or metals and/or germanium act as inert components in the phosphor. As previously noted, the scope of the claimed invention is not limited by any such explanation or theory presented herein. Taking into account the flux materials, formula II can be rewritten:

(formula III)

Q is one or more of Li, K, and Ge. The value of j is from $1 \times 10^{-6}$ to 0.05.

It is preferred that the alkali metal is lithium and it is more preferred that Q is a combination of Li and Ge. Formula III can be rewritten to include Li and Ge:

$(Ba_{1-a-b}Ca_aSr_b)(Hf_{1-c-d}Zr_cMg_e)\cdot wLi\cdot xGe:yCe,y'Ti,y''Pb$ (formula IV)

The value of w, is from 0 to 0.05, preferably from $1\times10^{-6}$ to 0.05, and more preferably from $1\times10^{-6}$ to 0.025. The value of x is from 0 to $1.5\times10^{-3}$, or preferably from $1\times10^{-6}$ to $1\times10^{-3}$, and more preferably from $1\times10^{-4}$ to $7\times10^{-4}$.

Ce, Ti, and Pb are activators that are present in the phosphor singly or in combination. The mole fraction of Ce, y, is from 0 to 0.025. The mole fraction of Ti, y', is from 0 to 0.05. The mole fraction of Pb, y'', is from 0 to 0.01. The total mole fraction of activator, $y+y'+y''$ is from $1\times10^{-6}$ to 0.05. In particular embodiments of the invention, at least two of y, y', and y'' are greater than or equal to $1\times10^{-6}$.

The phosphors of the invention provide useful prompt emission phosphors, storage phosphors, and scintillator crystals. Cerium activated phosphors of the invention exhibit very good prompt luminescence and photostimulated luminescence. Comparative Examples 115–117 demonstrate that, in contrast to Ce, some other lanthanides provide little or no activation. Phosphors of the invention, activated only by titanium and lead, exhibit good prompt luminescence, but relatively weak photostimulated luminescence. Mixtures of the activators including cerium provide good or very good prompt luminescence and photostimulated luminescence. For mixtures of activators in which cerium greatly predominates, it is believed that there is little or no distinction from phosphors of the invention activated only by cerium. For example, in phosphors of the invention activated by cerium in combination with trace amounts of titanium, the titanium activation appears to be quenched.

Referring again to formulas III and IV, for storage phosphors it is currently preferred that a is from 0 to 0.025, b is from 0 to 0.05, e is from 0 to 0.10, y is from $2\times10^{-4}$ to $5\times10^{-3}$, y' is from $1\times10^{-3}$ to $5\times10^{-3}$, y' is from $5\times10^{-4}$ to $1.5\times10^{-3}$, and $y+y'+y''$ is from $1\times10^{-6}$ to $5\times10^{-3}$. A more preferred activator range for y is from $5\times10^{-4}$ to $1\times10^{-3}$. A more preferred activator range for y' is from $1\times10^{-3}$ to $2.5\times10^{-3}$. It is more preferred that the predominant (in mole percent) or only activator is cerium and that y is from $5\times10^{-4}$ to $1\times10^{-3}$.

For prompt emission phosphors, it is currently preferred that y is from $2\times10^{-4}$ to 0.01, y' is from $1\times10^{-3}$ to $1\times10^{-2}$, and y'' is from $1.5\times10^{-3}$ to $5\times10^{-3}$. A more preferred activator range for y is from $5\times10^{-4}$ to $5\times10^{-3}$. A more preferred activator range for y' is from $5\times10^{-3}$ to $1\times10^{-2}$. It is highly preferred that the predominant (in mole percent) or only activator is cerium. A preferred range for Mg in the storage phosphors of the invention is: e is from 0.050 to 0.10. Within this range, luminescence is increased relative to the same phosphor lacking magnesium. This effect is surprising and not understood at this time.

Figure 1:
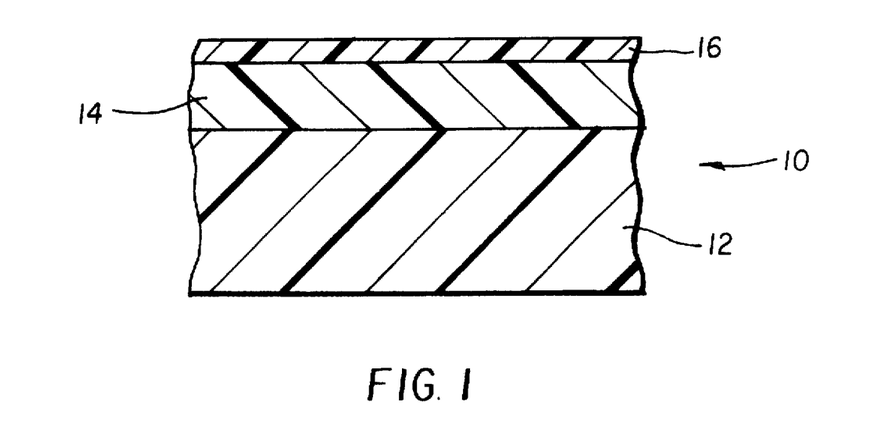
FIG. 1 is a diagrammatical cross-section of an embodiment of the phosphor screen of the invention configured as a radiographic phosphor screen.

Referring now to FIG. 1, the phosphor screen 10 of the invention, in particular embodiments, is a radiographic phosphor screen (sometimes also referred to as a radiographic panel) having a support 12 and a luminescent layer 14 overlaying the support 12. An overcoat layer 16, although not required, is commonly located over the luminescent layer 14 for humidity and wear protection.

The luminescent layer includes the composite phosphor in the form of a polycrystalline mass. Typically, a mass of individual particles are distributed in a binder, which gives the mass structural coherence and retains the mass on the support. The size and shape of the phosphor particles are determined, in the same manner as other phosphors, by requirements of a particular use and factors such as manufacturing constraints. Convenient parameters for a phosphor particulate useful in radiographic screens are a median particle size of from 1 to 40 micrometers.

Useful binders are those conventionally employed in the art. Binders are generally chosen from a wide variety of known organic polymers which are transparent to x-rays, stimulating light (for storage screens), and emitted light. Binders commonly employed in the art include sodium o-sulfobenzaldehyde acetal of poly(vinyl alcohol); chlorosulfonated poly(ethylene); a mixture of macromolecular bisphenol poly(carbonates) and copolymers comprising bisphenol carbonates and poly(alkylene oxides); aqueous ethanol soluble nylons; poly(alkyl acrylates and methacrylates) and copolymers of poly(alkyl acrylates and methacrylates with acrylic and methacrylic acid); poly(vinyl butyral); and poly(urethane) elastomers. These and other useful binders are disclosed in U.S. Pat. Nos. 2,502,529; 2,887,379; 3,617,285; 3,300,310; 3,300,311; and 3,743,833; and in Research Disclosure, Vol. 154, February 1977, Item 15444, and Vol. 182, June 1979. Research Disclosure is published by Kenneth Mason Publications, Ltd., Emsworth, Hampshire PO10 7DD, England. Particularly preferred binders are poly(urethanes), such as those commercially available under the trademark Estane from Goodrich Chemical Co., the trademark Permuthane from the Permuthane Division of ICI, and the trademark Cargill from Cargill, Inc.

Any conventional ratio of phosphor to binder can be employed. Generally thinner phosphor layers and sharper images are realized when a high weight ratio of phosphor to binder is employed. Preferred phosphor to binder ratios are in the range of from about 7:1 to 25:1 for screen constructions intended to withstand commercial exposure repetitions without loss of structural integrity. For limited or single exposure applications, any minimal amount of binder consistent with structural integrity is satisfactory.

For the highest attainable speeds a white support, such as a titania or barium sulfate loaded or coated support can be employed. Particular reflective supports which offer a balance of speed and sharpness are those containing reflective microlenslets, such as are disclosed in U.S. Pat. No. 4,912,333 to Roberts, et al. In those instances in which it is desired to reduce the effective thickness of a phosphor layer below its actual thickness the phosphor layer is modified to impart a small, but significant degree of light absorption. If the binder is chosen to exhibit the desired degree of light absorption, then no other ingredient of the phosphor layer is required to perform the light attenuation function. It is specifically noted that the less structurally complex chromophores for ultraviolet absorption particularly lend themselves to incorporation in polymers. A separate absorber can be incorporated in the phosphor layer to reduce its effective thickness. The absorber can be a dye or pigment capable of absorbing light within a desired spectrum. Black dyes and pigments such as carbon black are, of course, generally useful with phosphors, because of their broad absorption spectra. With storage screens, it is preferable to include a dye or pigment which absorbs some of the stimulating radiation, generally provided by a laser; but mostly reflects emitted light. U.S. Pat. No. 4,491,736, to Teraoka, teaches the use of such materials in storage screens.

Apart from the phosphor layers and the assembly features described above, the screen can be of any conventional construction. Screens typically have one or more flexible or rigid support layers. Flexible layers are most commonly polymeric. The most common polymeric supports are films of high dimensional integrity, such as poly(ethylene terephthalate) film supports. In a nonflexible screen, support is provided by one or more polymeric layers and by a rigid plate of aluminum or the like.

Metal layers, such as aluminum, enhance reflection. Paper supports, though less common than film supports, are known and can be used for specific applications. Dyes and pigments are commonly loaded into supports to enhance absorption or reflection of light. Air can be trapped in supports to reflect ultraviolet and visible light. Supports and the subbing layers used to improve coating adhesion can be chosen from among those employed for silver halide photographic and radiographic elements, as illustrated by *Research Disclosure*, Vol. 176, December 1978, Item 17643, Section XVII, and *Research Disclosure*, Vol. 184, August 1979, Item 18431, Section I.

The overcoat layer comprises a binder chosen using the criteria described above for the binder in the luminescent layer. The overcoat binder can be the same binder as in the luminescent layer or different and can also be chosen from polymers useful for supports. Polymers conventionally employed for film supports can be used in the overcoat layer. For example, cellulose acetate is an overcoat commonly used with the poly(urethane) binders. Overcoat polymers are often also used to seal the edges of the phosphor layer. A suitable overcoat is disclosed in U.S. Pat. No. 5,401,971.

While anticurl layers are not required for the screens, they are generally preferred for inclusion. The function of the anticurl layer is to balance the forces exerted by the layers coated on the opposite major surface of a support which, if left unchecked, could cause the support to assume a non-planar configuration, that is, to curl or roll up on itself. Materials forming the anticurl layers can be chosen from among those identified above for use as binders and overcoats. Generally an anticurl layer is formed of the same polymer as the overcoat on the opposite side of the support.

Any one or combination of conventional screen features compatible with the features described herein can, of course, be employed. Conventional storage screen constructions are disclosed in U.S. Pat. No. 4,380,702 to Takahashi et al, the disclosure of which is hereby incorporated by reference. Conventional intensifying screen constructions are disclosed in *Research Disclosure*, Vol. 184, August 1979, Item 18431, hereby incorporated herein by reference.

The radiographic screens are formed by conventional coating techniques. Phosphor powder and addenda are mixed with a solution of a resin binder material and coated by means such as blade coating onto a substrate. U.S. Pat. No. 4,505,989, to Umemoto et al, the disclosure of which is hereby incorporated herein by reference, describes suitable techniques known in the art for preparing a radiographic screen.

The phosphor screen of the invention, in some embodiments, is what can be referred to as a "large crystal device". In contrast to a radiographic screen, the mass of small phosphor particles is replaced by a relatively small number of large crystals or even a single very large crystal. The support and binder are replaced by a mechanical structure that holds the crystal or crystals in a desired orientation. The large crystal device can also include a light responsive element, such as an array of photodiodes. The crystals are arranged so that the longest dimension of each crystal is aligned with the direction of incident radiation. This maximizes the thickness, and thus the radiation stopping power, of the phosphor "layer". The crystals together define a surface that faces the direction or directions from which incident radiation is to be received. In many applications, such as computed tomography, it is desirable to capture only radiation incident from a single direction, the direction of the collimated beam used to image the subject matter. In these applications, the crystals define a plane. In some other applications, such as high energy physics detectors, it is desirable to capture radiation emitted in many directions from a particular location and the crystals therefore define a complex curved surface centered upon the site of origin of events to be detected. These multidirectional detectors are otherwise substantially similar to the unidirectional detectors previously described.

Figure 2:
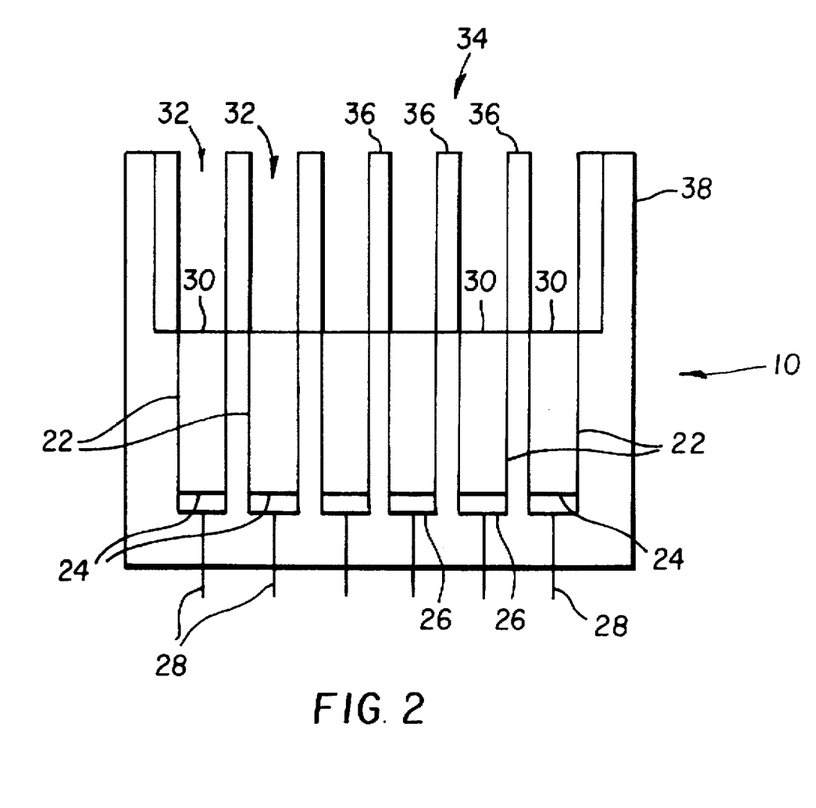
FIG. 2 is a partially schematic diagrammatical cross-section of another embodiment of the phosphor screen of the invention configured as a scintillator.

FIG. 2 is a partially schematic diagram of another configuration of the phosphor screen 10 of the invention: a unidirectional large crystal device. A series of large crystals 22 of the phosphor of the invention are arranged in parallel orientation, with respective crystal faces all aligned in the same directions. At the rear end face 24 of each crystal 22 is a photodetector 26 that is disposed to receive radiation emitted by the respective crystal 22 secondary to absorption of x-rays or other primary high energy radiation and transmit a signal through a signal line 28. The front end faces 30 are each substantially perpendicular to the detected radiation and each define a light path 32 extending outward from the respective front end face. Extending forward from the front end faces 30 of the crystals 22 is a collimator 34 of a material such as lead. The collimator has an array of collimator elements 36 bordering each light path 32 on two or more sides (only two sides are shown). The collimator elements 36 absorb incident radiation that is not substantially parallel to a respective crystal 22. The collimator can function as a support for the phosphor crystals and photodetectors; however, it is preferred that a separate support 38 hold the crystals 22, collimator 34, and photodetectors 26 in their relative orientations. The support 38 can take a variety of shapes and be made from a variety of materials. A primary consideration is ordinarily the ability of the support to maintain the various components in stable relative relation during use.

The method of the invention is suitable for producing the phosphor of the invention, particularly in the form of a mass of relatively large crystals or a large single crystal. A physical mixture is prepared by mixing: from about 0.15 to about 0.45 mole fraction $BaCO_3$ or BaO; from about 0.25 to about 0.60 mole fraction $BaF_2$, from about 0.15 to about 0.40 mole fraction $B_2O_3$, and $MO_2$ (M is Hf or Zr or both) in the range of from about 0.5 to about 10 wt % relative to the total weight of reactants. Outside these ranges, the yield of crystals is low, or non-existent. Higher concentrations of $BaF_2$ were found to tend to corrode the platinum crucible, making preparation impractical. Higher concentrations of $B_2O_3$ caused the formation of large crystals of $BaM(BO_3)_2$, where M is Zr, Hf, or both. In a preferred embodiment of the invention, the physical mixture also included $GeO_2$ at about the same concentration as the $MO_2$. This results in an improvement in the size and quality of phosphor crystals produced.

The physical mixture is heated to a temperature of from about 1150° C. to about 1550° C. for from 2 to about 22 hours. The resulting product is then cooled at a rate of from about 0.1° C./hr to about 25° C./hr. Slower cooling yields larger crystals of higher optical purity. Larger crystals can be grown with the application of accelerated crucible rotation as described in Scheel, J. Crystal Growth, Vol. 8, pages 304–306 (1971). A perferred rotation program is 0-60-0 rpm acceleration/decceleration over a period of 60 sec.

The following Examples and Comparative Examples are presented to further illustrate and elucidate some preferred modes of practice of the invention. Unless otherwise indicated, all starting materials were commercially obtained.

The relative luminescence response of the phosphor powder was measured by packing the phosphor powder into aluminum planchettes (2 mm high×24 mm diameter) at a coverage of about 1 g/cm² and exposing the sample to filtered X-radiation. The X-ray source was a tungsten target tube in a XRD 6 generator operating at 70 kVp and 10 mA. The filtration consisted of 0.5 mm copper and 1.0 mm aluminum. The luminescence response was measured at a temperature of approximately 300° K., using an IP-28 photomultiplier tube at 500 V bias. The voltage from the photomultiplier was measured with a Keithley high impedance electrometer and is proportional to the total light output of the sample.

The relative photostimulated luminescence (PSL) intensities of the storage powders were measured by packing the phosphor powder into aluminum planchettes (2 mm high×24 mm diameter) at a coverage of about 1 g/cm² and stimultaneously exposing the powder and an internal standard to unfiltered X-radiation. Screens were measured by cutting 2.6 centimeter diameter disks from the screens and stimultaneously exposing the disks and an internal standard to unfiltered X-radiation. The X-ray source was a tungsten target tube operating at 15 kVp and 3.0 mA. After exposure to X-rays, the samples and the standard were stimulated with a 4 msec pulse from a 12 mW helium-neon laser at a temperature of approximately 300° K. The stimulated emission was detected using a photomultiplier tube after passing through a Schott BG-25 filter. The responses were corrected for X-ray exposure variations by normalizing the measured response in each case to the internal standard.

Emission spectra were obtained with an instrument consisting of an Instruments S. A. Model HR 320 grating spectrometer coupled with a Princeton Applied Research Model 1421 intensified linear diode array detector. The data acquisition and processing was controlled by a Princeton Research Model 1460 OMA III optical multichannel analyzer. Spectra were corrected for the spectral response of the detector-spectrograph combination. Samples were placed in planchettes as described above and irradiated with X-rays from a tungsten target tube operated at 70 kVp and 10 mA. Spectra were taken with and without the filtration described above.

Stimulation spectra were obtained after exposure to X-rays (267 mR). Light from a 100 W tungsten-halogen bulb was dispersed with an Instruments S. A. Model HR 310 monochromator to provide the stimulating wavelength. The stimulated emission was detected at a temperature of approximately 300° K., by a integrating sphere/photomultiplier arrangement. After amplification, the signal was digitized through a microcomputer interface.

Energy efficiency of the materials was determined by exhaustive interrogation of screen samples which had been exposed to X-rays (approximately 20 mR) with a helium-neon laser. Stimulated emission light was measured with a PMT. The energy efficiency was calculated relative to a standard, in this case a screen of commercial BaFBr:Eu, with the appropriate adjustments made for coverage differences, material density, X-ray absorption, and filter transmissivity.

The stoichiometry given in the table headings is nominal and is only meant to indicate intentional substitution. No conclusions regarding lattice vacancies/interstitials or oxygen content are implied.

Comparative Example 1: $BaHfO_3$

The phosphor was prepared by the combination of one mole of $HfO_2$ (0.26 mole % $Zr^{4+}$) and 0.5 mole portions of $BaCO_3$ (99.99%) and $BaF_2$ (99.9% or better purity) in an agate mortar with acetone as a grinding aid. The ground powder was placed in an alumina crucible and fired in air for 8 hours in a box furnace at 1100° C. Following recovery and regrinding of the charge it was refired in the same furnace at 1280° C. for eight hours. The X-ray powder diffraction pattern of the charge showed the cubic perovskite $BaHfO_3$ as the major phase, with a small amount of hafnia as impurity.

The sample showed an emission spectrum dominated by an ultraviolet peak centered at approximately 315 nm. and a very weak peak centered at 410 nm which was attributed to titanium impurities. The relative prompt emission response of this material was set to equal 100. Values for prompt emission in other examples and comparative examples are relative to that value.

Comparative Example 2 and Examples 3–8: $Ba_{1-y}HfO_3:yCe^{3+}$

Each sample was prepared by combination of $HfO_2$ (0.26 mole % $Zr^{4+}$) and $BaCO_3$ (99.99%) and an aliquot of either a 0.1M or 1.0M $Ce^{3+}$ solution. The $Ce^{3+}$ solution was prepared from $Ce(NO_3)_3.6H_2O$ (99.9% or better purity) in distilled water. The materials were ground with an agate mortar and pestle in acetone. After drying, the samples were transferred to 20 ml alumina crucibles, covered with an alumina lid and heated in a box furnace to 1250° C. for 6 hours. Portions of each charge were then combined with following addenda mixture: 25 mole % $Li_2SO_4$ (99.7%); 10 mole % LiF (99.9% or better purity); 5 mole % $GeO_2$ (99.999%); in an agate mortar and pestle. Acetone was used as a grinding aid. The resulting powder was placed in an alumina crucible and covered with an alumina lid and placed in the center zone of a 3 inch diameter alumina tube in a horizontal tube furnace. A high purity $CO_2$ atmosphere (flow rate=1.5 liters/minute) was used throughout the process. After purging, the sample was heated to 1350° C. in 3 hours, held for 6 hours and then cooled over 6 hours to room temperature. The X-ray powder diffraction patterns of the fired materials show $BaHfO_3$ as the major phase. The $Ce^{3+}$ emission is located at approximately 380 nm. The relative prompt emission responses are shown in Table 1.

Ex. 2 has a higher response than Ex. 1 because of the more effective incorporation into $BaHfO_3$ of very small impurity levels (<50 ppm) of $Ti^{4+}$ in the starting $HfO_2$. The use of a addenda enhances this activation of the host compound. The titanium emission is completely quenched when $Ce^{3+}$ is incorporated. For example, Ex. 3 shows only a $Ce^{3+}$ emission, which is slightly weaker than the titanium emission of Ex. 2.

TABLE 1

$Ba_{1-y}HfO_3:yCe^{3+}$

| Example or Comparative Example | Value of y | Relative response |
| --- | --- | --- |
| Comparative Example 1 | 0.0 | 100 |
| Comparative Example 2 | 0.0 | 416 |
| Example 3 | 0.0002 | 294 |
| Example 4 | 0.0005 | 520 |
| Example 5 | 0.001 | 496 |
| Example 6 | 0.005 | 396 |
| Example 7 | 0.01 | 237 |
| Example 8 | 0.025 | 100 |

Examples 9–21: $Ba_{0.9995}Hf_{1-z}Zr_zO_3:0.0005Ce$

Theses samples were prepared as described in C.Ex. 2 and Exs. 3–8. Appropriate amounts of either $HfO_2$ (optical grade: 0.0087 mole % Zr or RGS: 0.249 mol % Zr) or $ZrO_2$ (RGS: 0.004 mole % Hf) with $BaCO_3$ (99.99%) in an agate mortar with acetone. For each value of z, the sample was ground with an aliquot of $Ce^{3+}$ solution corresponding to a 0.05 mole % $Ce^{3+}$ level. After firing to 1250° C., the samples were fired the addenda mixture to 1300° C. in $CO_2$ as described above. The relative responses are shown below in Table 2:

TABLE 2

$Ba_{0.9995}Hf_{1-z}Zr_zO_3:0.0005Ce$

| Example | Value of z | Relative response |
|---|---|---|
| Example 9 | 0.000087 | 1155 |
| Example 10 | 0.0002 | 1107 |
| Example 11 | 0.001 | 927 |
| Example 12 | 0.00249 | 352 |
| Example 13 | 0.005 | 345 |
| Example 14 | 0.01 | 437 |
| Example 15 | 0.025 | 373 |
| Example 16 | 0.05 | 349 |
| Example 17 | 0.10 | 270 |
| Example 18 | 0.25 | 100 |
| Example 19 | 050 | 30 |
| Example 20 | 0.75 | 10 |
| Example 21 | 1.00 | 6 |

Examples 22–30: $Ba_{0.9995}Hf_{1-e}Mg_eO_3:0.0005Ce$

Samples were prepared as in Ex. 9–21 using $HfO_2$ (RGS, 0.249 mole % Zr), $BaCO_3$ (99.99%), $Mg(CH_3CO_2)_2 \cdot 4H_2O$ (reagent grade) and aliquots of a 0.1M $Ce(NO_3)_3$ solution. In contrast to Ex. 9–21, the $HfO_2$ was milled in an attritor mill to reduce aggregate size. The samples were fired as above at 1250° C., followed by the 1300° C. firing under $CO_2$ with the $Li_2SO_4/LiF/GeO_2$ addenda mixture. The relative responses are shown below in Table 3:

TABLE 3

$Ba_{0.9995}Hf_{1-e}Mg_eO_3:0.0005Ce$

| Example or Comparative Example | Value of e | Relative response |
|---|---|---|
| Example 22 | 0 | 834 |
| Example 23 | 0.0005 | 834 |
| Example 24 | 0.005 | 747 |
| Example 25 | 0.015 | 538 |
| Example 26 | 0.025 | 785 |
| Example 27 | 0.05 | 673 |
| Example 28 | 0.075 | 659 |
| Example 29 | 0.10 | 305 |
| Example 30 | 0.15 | 104 |

Examples 31–36: $Ba_{0.9995-a}Ca_aHfO_3:0.0005Ce$

Samples were prepared as above using $HfO_2$ (RGS, 0.249 mole % Zr), $BaCO_3$ (99.99%), $CaCO_3$ (phosphor grade) and aliquots of a 0.1M $Ce(NO_3)_3$ solution. The samples were fired as above at 1250° C., followed by the 1300° C. firing under $CO_2$ with the $Li_2SO_4/LiF/GeO_2$ addenda mixture. The relative responses are shown below in Table 4:

TABLE 4

$Ba_{0.9995-a}Ca_aHfO_3:0.0005Ce$

| Example or Comparative Example | Value of a | Relative response |
|---|---|---|
| Example 31 | 0 | 935 |
| Example 32 | 0.0005 | 817 |
| Example 33 | 0.0025 | 790 |
| Example 34 | 0.01 | 810 |
| Example 35 | 0.025 | 619 |
| Example 36 | 0.05 | 538 |

Examples 37–42: $Ba_{0.9995-b}Sr_bHfO_3:0.0005Ce$

Samples were prepared as above using $HfO_2$ (RGS, 0.249 mole % Zr), $BaCO_3$ (99.99%), $SrCO_3$ (99.999%) and aliquots of a 0.1M $Ce(NO_3)_3$ solution. The samples were fired as above at 1250° C., followed by the 1300° C. firing under $CO_2$ with the $Li_2SO_4/LiF/GeO_2$ addenda mixture. The relative responses are shown below in Table 5.

TABLE 5

$Ba_{0.9995-b}Sr_bHfO_3:0.0005Ce$

| Example or Comparative Example | Value of b | Relative response |
|---|---|---|
| Example 37 | 0 | 731 |
| Example 38 | 0.0005 | 687 |
| Example 39 | 0.0025 | 808 |
| Example 40 | 0.01 | 740 |
| Example 41 | 0.025 | 731 |
| Example 42 | 0.05 | 689 |

Ex. 43: $BaHfO_3:0.005Ce^{3+}$

A $BaHfO_3:0.0005$ Ce precursor was prepared using $HfO_2$ (0.0249 mole % Zr, 3.4 wt % residual sulfate) from the partial decomposition of a hafnium basic sulfate starting material, in combination with 3 mole % excess of $BaCO_3$ (99.99%) and solid $Ce(NO_3)_3 \cdot 6H_2O$ (99.9% purity or better). The powders were ground and fired to 1250° C. as above. The resulting $BaHfO_3:0.0005$ Ce powder was then ground with 100 mole % $Li_2SO_4$ (99.7%), 18.75 mole % $GeO_2$ (99.999%), and 10 mole % $Li_2CO_3$ (99.997%) in acetone. The air-dryed sample was then heated at 1300° C. in 1.5 liters/minute $CO_2$. The relative response of the phosphor was 2187. The relative response of a commercial $CaWO_4$ screen (du Pont De Nemours & Co., Wilmington, Del.) under identical conditions is 431.

Example 44a and Comparative Examples 44b:
Single Crystal $BaHfO_3:Ce^{3+}$ Scintillator Single crystals of $BaZrO_3$ and $BaHfO_3$ were prepared by the slow cooling of addenda mixtures of BaO, $BaF_2$ and $B_2O_3$ with approximately 4 wt % dissolved $ZrO_2$ or $HfO_2$. The charges were cooled in platinum crucibles from 1400° C. to 800° C. at rates of 10° C./hr or less. Mixtures low in $B_2O_3$ showed no crystal growth and attacked the platinum crucible. Mixtures high in $B_2O_3$ showed the preferential growth of large $BaM(BO_3)_2$ single crystals. $GeO_2$ resulted in increases in crystal size. Generally, the crystals were blocks or plates with 1–4 mm dimensions. Optical clarity was high, and color ranged from colorless to light yellow.

A single crystal of $Ce^{3+}$-activated $BaHfO_3$ was grown from a mixture of 2.5 g $HfO_2$ (0.26 mole % $Zr^{4+}$), 20.60 g of BaCO$_3$ (99.99%), 32.13 g BaF$_2$ (99.9% or better purity), and 7.275 g of B$_2$O$_3$ (99.98%). The ground mixture was placed in a 60 ml platinum crucible, covered with a platinum lid and heated in a box furnace to 1343° C. over the course of 8 hours. The temperature was held for 8 hours and then reduced at 2° C./hr to 950° C., at which point the charge was air quenched. Several 1-3 mm block crystals were recovered, washed in acetic acid and examined for X-ray-excited luminescence. The crystals gave a emission spectra substantially identical to that of Example 4, indicating Ce$^{3+}$ incorporation and luminescence.

Comparative Example 45 and Examples 46–51: BaHfO$_3$:Ti$^{4+}$

An undoped BaHfO$_3$ precursor was prepared at 1250° C. as above from BaCO$_3$ (99.99%) and HfO$_2$ (RGS, 0.0249 mole % Zr). Portions of this charge were then ground with 100 mole % Li$_2$SO$_4$ (99.7 %) and the appropriate amount of TiO$_2$ (99.9% or better purity). The samples were then fired in alumina crucibles in air at 1300° C. in a box furnace. The emission spectrum of Example 46 indicated titanium activation. The relative responses of the samples are shown below in Table 6.

TABLE 6

BaHfO$_3$:y'Ti$^{4+}$

| Example or Comparative Example | Value of y' | Relative response |
|---|---|---|
| Comparative Example 45 | 0 | 19 |
| Example 46 | 0.001 | 198 |
| Example 47 | 0.0025 | 323 |
| Example 48 | 0.005 | 436 |
| Example 49 | 0.01 | 517 |
| Example 50 | 0.025 | 118 |
| Example 51 | 0.05 | 104 |

Example 52: Single crystal BaHfO$_3$:Ti$^{4+}$ Scintillator

A single crystal of Ti$^{4+}$-activated BaHfO$_3$ was grown from a mixture of 2.5 g HfO$_2$ (0.26 mole % Zr$^{4+}$), 22.50 g of BaCO$_3$ (99.99%), 27.50 g BaF$_2$ (99.9% or better purity), and 10.00 g of B$_2$O$_3$ (99.98%). The ground mixture was placed in a 60 ml platinum crucible, covered with a platinum lid and heated in a box furnace to 1343° C. over the course of 8 hours. The temperature was held for 8 hours and then reduced at 4° C./hr to 950° C., at which point the charge was air quenched. Several 1-2 mm block crystals were recovered and examined for X-ray-excited luminescence. The crystals gave a emission spectra substantially identical to that of Example 46, indicating titanium incorporation and luminescence.

Comparative Example 53 and Examples 54–56: BaHfO$_3$:Pb$^{2+}$

An undoped BaHfO$_3$ precursor was prepared at 1250° C. as above from BaCO$_3$ (99.99%) and HfO$_2$ (RGS, 0.0249 mole % Zr). Portions of this charge were then ground with the addenda mixture described in Ex. 2 and the appropriate amount of Pb(OOCCH$_3$)·3H$_2$O (99.9% or better purity). The samples were then fired as described in Ex. 2. The emission spectrum is shown in FIG. 4.

The relative responses of the samples are shown below in Table 7.

TABLE 7

BaHfO$_3$:y"Pb$^{2+}$

| Example or Comparative Example | Value of y" | Relative response |
|---|---|---|
| Comparative Example 53 | 0 | 80 |
| Example 54 | 0.0005 | 88 |
| Example 55 | 0.0015 | 224 |
| Example 56 | 0.005 | 204 |

Comparative Examples 57–58 and Examples 59–64: BaHfO$_3$ and Ba$_{1-y}$HfO$_3$:yCe$^{3+}$ The phosphors of Comparative Examples 1–2 and Examples 3–8 were tested for photostimulated luminescence in Comparative Examples 57–58 and Examples 59–64, respectively. Results appear in Table 8.

The relative PSL response of the material of Comparative Example 57 is set equal to 1. Values for prompt emission in other examples and comparative examples herein are relative to that value.

The dark decay, or signal retention after exposure, for a sample of phosphor prepared as described in Example 4 was determined. Commercial storage phosphors based on BaFBr and BaFBr$_{1-x}$I$_x$ show a 20% loss in signal after 30–60 minutes, where BaHfO$_3$:Ce$^{3+}$ does not reach 20% signal loss until at least 70 hours.

Ex. 58 has a higher response than Ex. 57 because of the more effective incorporation of starting material. The use of the addenda mixture enhances the PSL activation of the host compound by trace titanium levels. The titanium emission is completely quenched when Ce$^{3+}$ is incorporated.

The stimulation spectra of a phosphor prepared as described in Example 4 was obtained. The stimulation band has a single peak centered at 600 nm which is well-matched to He—Ne lasers used in commercial computed radiography systems.

TABLE 8

Ba$_{1-y}$HfO$_3$:yCe

| Example or Comparative Example | Value of y | Relative PSL |
|---|---|---|
| Comparative Example 57 | 0.0 | 1 |
| Comparative Example 58 | 0.0 | 27 |
| Example 59 | 0.0002 | 92 |
| Example 60 | 0.0005 | 144 |
| Example 61 | 0.001 | 148 |
| Example 62 | 0.005 | 99 |
| Example 63 | 0.01 | 16 |
| Example 64 | 0.025 | 10 |

Examples 64–76: Ba$_{0.9995}$Hf$_{1-z}$Zr$_z$O$_3$:0.0005Ce

The phosphors of Examples 9–21 were tested for photostimulated luminescence in Examples 64–76, respectively. The PSL responses are shown below in Table 9:

TABLE 9

$Ba_{0.9995}Hf_{1-z}Zr_zO_3:0.0005Ce$

| Example or Comparative Example | Value of z | Relative PSL |
|---|---|---|
| Example 64 | 0.000087 | 54 |
| Example 65 | 0.0002 | 54 |
| Example 66 | 0.001 | 70 |
| Example 67 | 0.00249 | 70 |
| Example 68 | 0.005 | 66 |
| Example 69 | 0.01 | 99 |
| Example 70 | 0.025 | 95 |
| Example 71 | 0.05 | 95 |
| Example 72 | 0.10 | 73 |
| Example 73 | 0.25 | 21 |
| Example 74 | 0.50 | 5 |
| Example 75 | 0.75 | 0 |
| Example 76 | 1.00 | 5 |

Examples 77–85: $Ba_{0.9995}Hf_{1-e}Mg_eO_3:0.0005Ce$

The phosphors of Examples 22–30 were tested for photostimulated luminescence in Examples 77–85, respectively. The relative PSL responses are shown below in Table 10:

TABLE 10

$Ba_{0.9995}Hf_{1-e}Mg_eO_3:0.0005Ce$

| Example or Comparative Example | Value of e | Relative PSL |
|---|---|---|
| Example 77 | 0 | 272 |
| Example 78 | 0.0005 | 274 |
| Example 79 | 0.005 | 279 |
| Example 80 | 0.015 | 258 |
| Example 81 | 0.025 | 279 |
| Example 82 | 0.05 | 323 |
| Example 83 | 0.075 | 343 |
| Example 84 | 0.10 | 289 |
| Example 85 | 0.15 | 130 |

Examples 86–91: $Ba_{0.9995-a}Ca_aHfO_3:0.0005Ce$

The phosphors of Examples 31–36 were tested for photostimulated luminescence in Examples 86–91, respectively. The relative PSL responses are shown below in Table 11:

TABLE 11

$Ba_{0.9995-a}Ca_aHfO_3:0.0005Ce$

| Example or Comparative Example | Value of a | Relative PSL |
|---|---|---|
| Example 86 | 0 | 296 |
| Example 87 | 0.0005 | 294 |
| Example 88 | 0.0025 | 281 |
| Example 89 | 0.01 | 277 |
| Example 90 | 0.025 | 245 |
| Example 91 | 0.05 | 209 |

Examples 92–97: $Ba_{0.9995-b}Sr_bHfO_3:0.0005Ce$

The phosphors of Examples 37–42 were tested for photostimulated luminescence in Examples 92–97, respectively. The relative PSL responses are shown below in Table 12:

TABLE 12

$Ba_{0.9995-b}Sr_bHfO_3:0.0005Ce$

| Example or Comparative Example | Value of b | Relative PSL |
|---|---|---|
| Example 92 | 0 | 287 |
| Example 93 | 0.0005 | 296 |
| Example 94 | 0.0025 | 300 |
| Example 95 | 0.01 | 266 |
| Example 96 | 0.025 | 292 |
| Example 97 | 0.05 | 234 |

Ex. 98: $BaHfO_3: 0.005Ce^{3+}$ Storage Screen

The phosphor of Example 43 was tested for photostimulated luminescence. The relative response of the phosphor was 146.

The phosphor was added to a 13% polyurethane solution (Permuthane TM, from ICI, Inc.) in a methylene chloride and methanol mixture to produce a dispersion with 21 parts of phosphor to 1 part of binder by weight. The mixture was dispersed using 1/32 inch zirconium beads for 4.5 hours in a paint shaker. The dispersion was coated on blue-tinted transparent poly(ethylene terephthalate) film support at 106.6 g/ft². The relative response of the coating was 93. The energy efficiency of this screen was determined to be approximately 55% of that of the commercial BaFBr screen.

Examples 99–102: $BaHfO_3:Ti^{4+}$

The phosphors of Examples 46–51 were tested for photostimulated luminescence in Examples 99–102, respectively. The relative PSL responses of the samples are shown below in Table 13:

TABLE 13

$BaHfO_3:y'Ti^{4+}$

| Example or Comparative Example | Value of y' | Relative PSL Response |
|---|---|---|
| Example 99 | 0.001 | 21 |
| Example 100 | 0.0025 | 24 |
| Example 101 | 0.005 | 13 |
| Example 102 | 0.01 | 5 |

Comparative Example 103 and Examples 104–106: $BaHfO_3:Pb^{2+}$

The phosphors of Comparative Example 53 and Examples 54–56 were tested for photostimulated luminescence in Comparative Example 103 and Examples 104–106, respectively. The relative PSL of the samples are shown below in Table 14:

TABLE 14

$BaHfO_3:y''Pb^{2+}$

| Example or Comparative Example | Value of y'' | Relative PSL response |
|---|---|---|
| Comparative Example 103 | 0 | 9 |
| Example 104 | 0.0005 | 22 |
| Example 105 | 0.0015 | 33 |
| Example 106 | 0.005 | 9 |

Examples 107–108: $BaHfO_3:0.001Ce$: No Alkali Metal Addenda

A sample was prepared by the combination of equimolar amounts of $HfO_2$ (0.26 mole % $Zr^{4+}$) and $BaCO_3$ (99.99%), with the appropriate amount of solid Ce(NO₃)₃·6H₂O (REacton), in an agate mortar and pestle with acetone as a grinding aid. The ground powder was placed in an alumina crucible and fired in a box furnance at 1100° C., 1280° C., 1400° C., and 1500° C. in air with grindings between each firing. The powder was then baked in a tube furnance under an argon flow at 1200° C. The relative prompt emission response of this material was determined to be 4 and the relative PSL response was 5.

Examples 109–110: BaHfO₃:0.0005Ce with Sodium or Potassium as Addenda

A sample was prepared by the combination of equimolar amounts of HfO₂ (0.26 mole % $Zr^{4+}$) and BaCO₃ (99.99%), with the appropriate amount of solid Ce(NO₃)₃·6H₂O (REacton), in an agate mortar and pestle with acetone as a grinding aid. The ground powder was placed in an alumina crucible and fired in a box furnance at 1250° C. for 6 hours. Separate portions of the powder were then combined with 75 mole % Na₂SO₄ (99.99%) or K₂SO₄ (99.99%) in an agate mortar and pestle. Each portion was placed into the inner alumina crucible of a double crucible set, with the outer alumina crucible containing decolorizing carbon (used to provide a reducing atmosphere). An alumina lid covered inner and outer crucibles. The double crucible set for each portion was then fired at 1250° C. in air in a box furnace. After this firing, each portion was refired within a single crucible at 1325° C. and 1425° C. in air in a box furnace. The relative prompt and PSL responses were determined and are listed in Table 15.

TABLE 15

BaHfO₃:0.0005Ce with sodium or potassium as addenda

| Example or Comparative Example | Addenda | Relative prompt response | Relative PSL |
|---|---|---|---|
| 109 | Na₂SO₄ | 13 | 0.02 |
| 110 | K₂SO₄ | 48 | 44 |

Examples 111–112: Ba₀.₉₉₉₂₅Hf₀.₉₀Zr₀.₀₂₅Mg₀.₀₇₅O₃:0.00075Ce

A sample was prepared as described in Exs. 2–8 using HfO₂ (RGS, 0.249-mole % Zr), ZrO₂ (RGS, 0.0004 mole % Hf) with BaCO₃ (99.99%), Mg(CH₃CO₂)₂·4H₂O (reagent grade) and Ce(NO₃)₃·6H₂O (REacton). The sample was fired at 1250° C., followed by a 1300° C. firing under CO₂ with the Li₂SO₄/LiF/GeO₂ addenda mixture. After washing, the relative responses were: relative PSL=282 and relative prompt response=556.

Examples 113–114: BaHfO₃: 0.0005Ce,0.0005Pb

A sample was prepared as described in Exs. 2–8 using HfO₂ (RGS, 0.249 mole % Zr), BaCO₃ (99.99%), and Ce(NO₃)₃·6H₂O (REacton). The precursor mixture was fired at 1250° C., and then ground with an aliquot of 0.01M Pb(CH₃COO)₂ (reagent grade), 100 mole % Li₂SO₄ (99.7%) and 10 mole % Li₂CO₃ (99.997%). The mixture was fired at 1300° C. under CO₂. The relative responses of the washed and dried powder were: relative PSL=82.4 and relative prompt response=400.

Comparative Example 115: BaHfO₃:0.0005Pr

The sample was prepared in substantially the same manner as in Example 4 with the exception that Pr(NO₃)₃ (99.9% or better purity), was used in place of Ce(NO₃)₃·6H₂O and GeO₂ was not added. The relative prompt response of the sample was 32. No photostimulated luminescence was observed.

Comparative Example 116: BaHfO₃:0.0005Tb

The sample was prepared in substantially the same manner as in Comparative Example 115, except Tb(NO₃)₃ (99.9% or better purity) was used in place of Pr(NO₃)₃. The relative prompt response of the sample was 44. No photostimulated luminescence was observed.

Comparative Example 117: BaHfO₃:0.0005Gd

The sample was prepared in substantially the same manner as in Comparative Example 115, except Gd(NO₃)₃ (99.9% or better purity) was used in place of Pr(NO₃)₃. The relative prompt response of the sample was 78. More than 90 percent of the luminescence intensity was explainable as being due to an impurity level $Ti^{4+}$ emission. No photostimulated luminescence was observed.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

What is claimed is:

1. A radiographic storage screen for storing an image pattern of X-radiation exposure that when exposed with stimulating light at 300° K. emits light in the image pattern of X-radiation exposure comprising a support and, coated on the support, at least one layer forming a luminescent portion and an overcoat layer, said luminescent portion and overcoat layer each including a binder that is transparent to the X-radiation, the stimulating light and the emitted light and said luminescent portion including phosphor particles in a weight ratio of phosphor particles to binder of 7:1 to 25:1, said phosphor comprising oxygen and a combination of species characterized by the relationship:

$$(Ba_{1-d}M_d)(Hf_{1-z-e}Zr_zMg_e):yCe,y'Ti,y''Pb$$

wherein

M is selected from the group consisting of Ca, Sr, and combinations thereof;

d is from 0 to 0.05;

z is from 0 to 0.25;

e is from 0 to 0.15;

y is from 1×10⁻⁶ to 0.025;

y' is from 0 to 0.05;

y" is from 0 to 0.01; and y+y'+y" is from 1×10⁻⁶ to 0.05.

2. The radiographic storage screen of claim 1 wherein y is from 1×10⁻⁶ to 0.025.

3. The radiographic storage screen of claim 1 wherein y is from 2×10⁻⁴ to 0.025.

4. The radiographic storage screen of claim 3 wherein y≧y' and y≧y".

5. The radiographic storage screen of claim 3 wherein y' is 0 and y" is 0.

6. The radiographic storage screen of claim 1 wherein y is from 2×10⁻⁴ to 5×10⁻³.

7. The radiographic storage screen of claim 1 wherein y is from 5×10⁻⁴ to 1×10⁻³.

8. The radiographic storage screen of claim 1 wherein said phosphor comprises oxygen and a combination of species characterized by the relationship:

$$(Ba_{1-a-b}Ca_aSr_b)(Hf_{1-z-e}Zr_zMg_e):yCe,y'Ti,y''Pb$$

wherein a is from 0 to 0.05;

b is from 0 to 0.05;

a+b is from 0 to 0.05;

z is from 0 to 0.25;

e is from 0 to 0.15;

y is from $2\times10^{-4}$ to 0.025;

y' is from 0 to 0.05;

y'' is from 0 to 0.01; and y+y'+y'' is from $1\times10^{-6}$ to 0.05.

9. A radiographic storage screen for storing an image pattern of X-radiation exposure that when exposed with stimulating light at 300° K. emits light in the image pattern of X-radiation exposure comprising a support and, coated on the support, at least one layer forming a luminescent portion and an overcoat layer, said luminescent portion and overcoat layer each including a binder that is transparent to the X-radiation, the stimulating light and the emitted light and said luminescent portion including phosphor particles in a weight ratio of phosphor particles to binder of 7:1 to 25:1, said phosphor comprising oxygen and a combination of species characterized by the relationship:

$$(Ba_{1-a-b}Ca_aSr_b)(Hf_{1-z-e}Zr_zMg_e)\cdot jQ:yCe,y'Ti,y''Pb$$

wherein

Q is at least one of Li and K;

a is from 0 to 0.05;

b is from 0 to 0.05;

a+b is from 0 to 0.05;

z is from 0 to 0.25;

e is from 0 to 0.15;

j is from $1\times10^{-6}$ to 0.05;

y is from $2\times10^{-4}$ to 0.025;

y' is from 0 to 0.05;

y'' is from 0 to 0.01; and y+y'+y'' is from $1\times10^{-6}$ to 0.05.

10. The radiographic storage screen of claim 1 wherein said phosphor consists essentially of oxygen and a combination of species characterized by the relationship:

$$(Ba_{1-a-b}Ca_aSr_b)(Hf_{1-z-e}Zr_zMg_e)\cdot wLi\cdot xGe:yCe,y'Ti,y''Pb$$

wherein a is from 0 to 0.05;

b is from 0 to 0.05;

a+b is from 0 to 0.05;

z is from 0 to 0.25;

e is from 0 to 0.15;

w is from 0 to 0.05;

x is from 0 to $1.5\times10^{-3}$;

w+x is from $1\times10^{-6}$ to 0.05;

y is from $2\times10^{-4}$ to 0.025;

y' is from 0 to 0.05;

y'' is from 0 to 0.01; and y+y'+y'' is from $1\times10^{-6}$ to 0.05.

11. The radiographic storage screen of claim 10 wherein w is from $1\times10^{-6}$ to 0.05.

12. The radiographic storage screen of claim 10 wherein w is from $1\times10^{-6}$ to 0.025.

13. The radiographic storage screen of claim 10 wherein x is from $1\times10^{-4}$ to $7\times10^{-4}$.

14. A radiographic storage screen for storing an image pattern of X-radiation exposure that when exposed with stimulating light at 300° K. emits light in the image pattern of X-radiation exposure comprising a support and, coated on the support, at least one layer forming a luminescent portion and an overcoat layer, said luminescent portion and overcoat layer each including a binder that is transparent to the X-radiation, the stimulating light and the emitted light and said luminescent portion including phosphor particles in a weight ratio of phosphor particles to binder of 7:1 to 25:1, said phosphor being crystallized as the cubic Perovskite structure (Pm3m space group) as determined by X-ray powder diffraction using $Cu_{\alpha1}$ irradiation and comprised of oxygen and a combination of species characterized by the relationship:

$$(Ba_{1-d}M_d)(Hf_{1-z-e}Zr_zMg_e):yCe,y'Ti,y''Pb$$

wherein

M is selected from the group consisting of Ca, Sr, and combinations thereof;

d is from 0 to 0.05;

z is from 0 to 0.25;

e is from 0 to 0.15;

y is from $1\times10^{-6}$ to 0.025;

y' is from 0 to 0.05;

y'' is from 0 to 0.01; and y+y'+y'' is from $1\times10^{-6}$ to 0.05.

15. A radiographic storage screen for storing an image pattern of X-radiation exposure that when exposed with stimulating light at 300° K. emits light in the image pattern of X-radiation exposure comprising a support and, coated on the support, at least one layer forming a luminescent portion and an overcoat layer, said luminescent portion and overcoat layer each including a binder that is transparent to the X-radiation, the stimulating light and the emitted light and said luminescent portion including phosphor particles in a weight ratio of phosphor particles to binder of 7:1 to 25:1, said phosphor comprising oxygen and a combination of species characterized by the relationship:

$$(Ba_{1-a-b}Ca_aSr_b)(Hf_{1-z-e}Zr_zMg_e):yCe$$

wherein a is from 0 to 0.05;

b is from 0 to 0.05;

a+b is from 0 to 0.05;

z is from 0 to 0.25;

e is from 0 to 0.15; and y is from $1\times10^{-6}$ to 0.025.

16. The radiographic storage screen of claim 15 wherein said phosphor consists essentially of oxygen and a combination of species characterized by the relationship:

$$(Ba_{1-a-b}Ca_aSr_b)(Hf_{1-z-e}Zr_zMg_e)\cdot wLi\cdot xGe:yCe$$

wherein a is from 0 to 0.05;

b is from 0 to 0.05;

a+b is from 0 to 0.05;

z is from 0 to 0.25;

e is from 0 to 0.15;

w is from 0 to 0.05;

x is from 0 to $1.5 \times 10^{-3}$;

w+x is from $1 \times 10^{-6}$ to 0.05; and y is from $2 \times 10^{-4}$ to 0.025.

17. The radiographic storage screen of claim 16 wherein w is from $1 \times 10^{-6}$ to 0.05.

18. The radiographic storage screen of claim 16 wherein w is from $1 \times 10^{-6}$ to 0.025.

19. The radiographic storage screen of claim 17 wherein x is from $1 \times 10^{-6}$ to $1 \times 10^{-3}$.

20. The radiographic storage screen of claim 17 wherein x is from $1 \times 10^{-4}$ to $7 \times 10^{-4}$.

21. The radiographic storage screen of claim 16 wherein:

a is from 0 to 0.025, b is from 0 to 0.05, and e is from 0 to 0.10.

22. The radiographic storage screen of claim 21 wherein e is from 0.050 to 0.10.

23. A method for preparing phosphor crystals comprising the steps of:

admixing: (a) from 15 to 45 mole percent $BaCO_3$ or BaO, (b) from 25 to 60 mole percent $BaF_2$, (c) from 15 to 40 mole percent $B_2O_3$, and (d) from 0.5 to 10 weight/weight percent $MO_2$ (where M is at least one of Hf and Zr) relative to the total weight of the (a), (b), and (c) materials, to form an admixture;

firing said admixture at a temperature of from 1150° C. to 1550° C. for from 2 to 22 hours to produce a molten intermediate; and cooling said molten intermediate at a temperature ramp of from 0.1° to 25° C./hour to yield said phosphor crystals.

24. The method of claim 23 wherein said molten intermediate is rotated during said cooling in a repeating 1 minute cycle in which said molten intermediate is accelerated from 0 revolutions per minute to 60 revolutions per minute and then deccelerated to 0 revolutions per minute at a rate of acceleration and deceleration having a substantially uniform absolute value.

25. The method of claim 23 further comprising adding into said admixture $1 \times 10^{-6}$ to 5 weight/weight percent Ce salt or Ti salt relative to the total weight of the (a), (b), and (c) materials.

26. An imaging process comprising (A) exposing with X-radiation in an image pattern a radiographic storage screen according to any one of claims 1, 9 and 14 and (B) exposing the screen with light to stimulate light emission in the image pattern of X-radiation exposure.

27. An imaging process according to claim 26 wherein the radiographic storage screen is exposed with a helium-neon laser to stimulate light emission.

* * * * *